United States Patent
Lee et al.

(10) Patent No.: US 6,362,911 B1
(45) Date of Patent: Mar. 26, 2002

(54) BURST MODE OPTICAL RECEIVER USING TWO AMPLIFIERS HAVING DIFFERENT BANDWIDTH

(75) Inventors: Chang Hee Lee, Taejeon; Jang Won Park, Choongchungnam-do; Jong Uk Chae; Jong Won Kim, both of Traejeon, all of (KR)

(73) Assignee: Electronics and Telecommunications Research Institute, Taejeon (KR)

( * ) Notice: Subject to any disclaimer, the term of this patent is extended or adjusted under 35 U.S.C. 154(b) by 0 days.

(21) Appl. No.: 09/211,422

(22) Filed: Dec. 15, 1998

(30) Foreign Application Priority Data

Dec. 17, 1997 (KR) .............................................. 97-69541

(51) Int. Cl.$^7$ ................................................ H04J 14/02
(52) U.S. Cl. ........................ 359/193; 359/179; 359/349; 359/127
(58) Field of Search ................................ 359/189, 193, 359/195, 179, 349, 127

(56) References Cited

U.S. PATENT DOCUMENTS

| | | | | |
|---|---|---|---|---|
| 4,998,295 A | * | 3/1991 | Siegel | 359/193 |
| 5,025,456 A | | 6/1991 | Ota | 375/76 |
| 5,339,187 A | * | 8/1994 | Nelson | 359/173 |
| 5,499,244 A | | 3/1996 | Mosch et al. | 370/94.1 |
| 5,687,261 A | * | 11/1997 | Logan | 385/24 |
| 5,786,918 A | * | 7/1998 | Suzuki et al. | 359/135 |
| 6,104,527 A | * | 8/2000 | Yang | 359/341 |

OTHER PUBLICATIONS

Charles A. Eldering, "Theoretical Determination of Sensitivity Penalty for Burst Mode Fiber Optic", Journal of Lightwave Technology, vol., 11, No. 12, Dec. 1993, pp.2149 2145.

Nakamura et al., "An Instantaneous Response CMOS Optical Receiver IC with Wide Dynamic Range and Extremely High Sensitivity using Feed–Forward Auto–Bias Adjustment", Journal of Solid–State Circuits. vol. 30, No. 9, Sep. 1995, pp. 991–997.

Ota et al. "Burst–Mode Compatible Optical Receiver With A Large Dynamic Range", Journal of Lightwave Technology, vol. 8, No. 12 Dec. 1990.

* cited by examiner

*Primary Examiner*—Leslie Pascal
(74) *Attorney, Agent, or Firm*—Cohen, Pontani, Lieberman & Pavane

(57) ABSTRACT

A burst mode optical receiver using two amplifiers having different bandwidth. The receiver includes an optical coupler separating an input optical signal into two parts and outputting the same, a delay circuit formed of a first optical fiber delaying an optical signal packet outputted through the optical coupler by a half of packet duration and a second optical fiber passing the optical signal packet without delay, and a first pre-amplifier having a high bandwidth for receiving an optical signal from the first optical fiber and amplifying the same and a second pre-amplifier having a low bandwidth for receiving an optical signal from the second optical fiber and amplifying the same, for thereby improving a receiving sensitivity without using a preamble bit.

3 Claims, 3 Drawing Sheets

1/2Packet-Time delayed packet envelop

Narrow bandwidth pre-amplifier output

Sampling control signals

——— S/H
- - - - Reset

Adjusted threshold voltage

BURST MODE OPTICAL RECEIVER USING TWO AMPLIFIERS HAVING DIFFERENT BANDWIDTH

BACKGROUND OF THE INVENTION

1. Field of the Invention

The present invention relates to a burst mode optical receiver using two amplifiers having different bandwidth, and in particular to an improved burst mode optical receiver using two amplifiers having different bandwidth which is capable of significantly improving a receiver sensitivity without using a preamble bit.

2. Description of the Conventional Art

Recently, the TDMA(Time Division Multiple Access) using a fast packet signal for a high speed multimedia signal transmission has been intensively investigated. In a central office of the above-described system, in order to reduce subscriber cost, the packet signals from various subscribers are received using one optical receiver. Therefore, the size and phase of the received packet signals are different for every packet.

These signals are called a burst signal. The burst mode optical receiver is used for receiving these burst signals.

In a conventional poing-to-point optical communication system, the output of the linear channel is AC coupled to the decision circuit to fix decision threshold voltage as a constant. In order to receive the burst data using the optical receiver, an idle time(sum of guard a time and a preamble time) should be increased between the packets. However, if the idle time is increased, the transmission efficiency of the packet is decreased. If the capacity of the coupling condenser is decreased for decreasing the idle time, another apparatus for coding/decoding the data which are transmitted is needed. Therefore, a burst mode optical receiver is disclosed, which is capable of coping with various size variations of an input signal with a short idle time and having a wide dynamic range.

In the burst mode optical receiver, in order to remove the effects of the coupling condenser, a DC-coupling method is used differently from the conventional method. In addition, the power variation of the input signal is detected and is fed back to a pre-amplifier or to an amplifier of the next circuit for thereby obtaing the optimum threshold value of the decision circuit (in most case, a limiting amplifier) based on the power variation of the input signal. The burst mode optical receiver is classified into a feed back type and a feed forward type based on the compensation type.

The burst mode receiver of the feed back type disclosed in U.S. Pat. No. 5,025,456 (Ota and Swartz) is formed of a pre-amplifier and a limiting amplifier having a differential input. The variation in the average value of the input signal is detected from an output signal of the pre-amplifier using the optimum detection circuit and is fed back to a differential input of the input terminal of the pre-amplifier for thereby receiving a quickly changing burst signal. In addition, in order to enhance the performance of the receiver, a method for decreasing an extinction ratio penalty and a method for receiving a low and high speed data are disclosed in the article of the 1 Gb/s burst mode optical receiver. In this method, the pre-amplifier and limiting amplifier are designed to have a differential input and output. This burst mode optical receiver has a 1.5 dB penalty compared to the conventional optical receiver in view of the receiver sensitivity. If the signal is not inputted, a proper off-set voltage should be set in order to prevent an increase of error.

As another method for implementing the burst mode optical receiver, there is a feed-forward method disclosed by Nakamura, et al., "An Instantaneous Response CMOS Optical Receiver IC with Wide Dynamic Range and Extremely High Sensitivity Using Feed-Forward Auto-Bias Adjustment", Journal of Solid-State Circuits, Vol. 30, No. 9, September 1995, pp. 991–997. In this method, a maximum value and minimum value of the signal is detected at the output of the preamplifier and a mean value is computed. This mean value is a threshold value for determining a level 1 and a level 0 of the signal by the limiting amplifier.

In this method, this method is easily implemented. Since the threshold voltage is extracted from a noise-contained 1 bit sampling voltage for thereby causing a 1.5 dB power penalty same as the previously described method.

In addition, in another method, a preamble bit is inserted irrespective of the data to be transmitted to the front of the packet for decreasing the 1.5 dB power penalty compared to the conventional burst mode optical receiver. In the receiving terminal, the received preamble bits are averaged for thereby controlling a threshold voltage and decreasing the noise of the threshold voltage control signal and the penalty.

SUMMARY OF THE INVENTION

Accordingly, it is an object of the present invention to provide a burst mode optical receiver using two amplifiers having different bandwidth which overcomes the aforementioned problems encountered in the conventional art.

It is another object of the present invention to provide a burst mode optical receiver using two amplifiers having different bandwidth which is capable of improving a receiver sensitivity without using a preamble bit.

In order to achieve the above objects, there is provided a burst mode optical receiver using two amplifiers having different bandwidth which includes an optical coupler for splitting an input optical signal into two parts and outputting the split optical signals, a delay circuit formed of a first optical fiber delaying an optical signal packet outputted from the optical coupler by a half of packet duration and a second optical fiber passing the optical signal packet without delaying the optical signal packet, a first photodiode for receiving a first optical signal on the first optical filter and for generating a first electrical signal from the received first optical signal, a second photodiode for receiving a second optical signal on the second optical fiber and for generating a second electrical signal from the received second optical signal, a first pre-amplifier having a wide bandwidth for receiving a first electrical signal from the first photodiode and amplifying the first electrical signal, and a second pre-amplifier having a narrow bandwidth for receiving a second electrical signal from the second photodiode and amplifying the second electrical signal.

In the present invention, a novel burst mode optical receiver capable of decreasing a 1.5 dB penalty is disclosed. The optical receiver is formed of an optical coupler, an optical delay unit, and two pre-amplifiers having different bandwidth, so that it is possible to extract a threshold voltage control signal by integrating data and removing noise without using the preamble bits.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly leveled out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
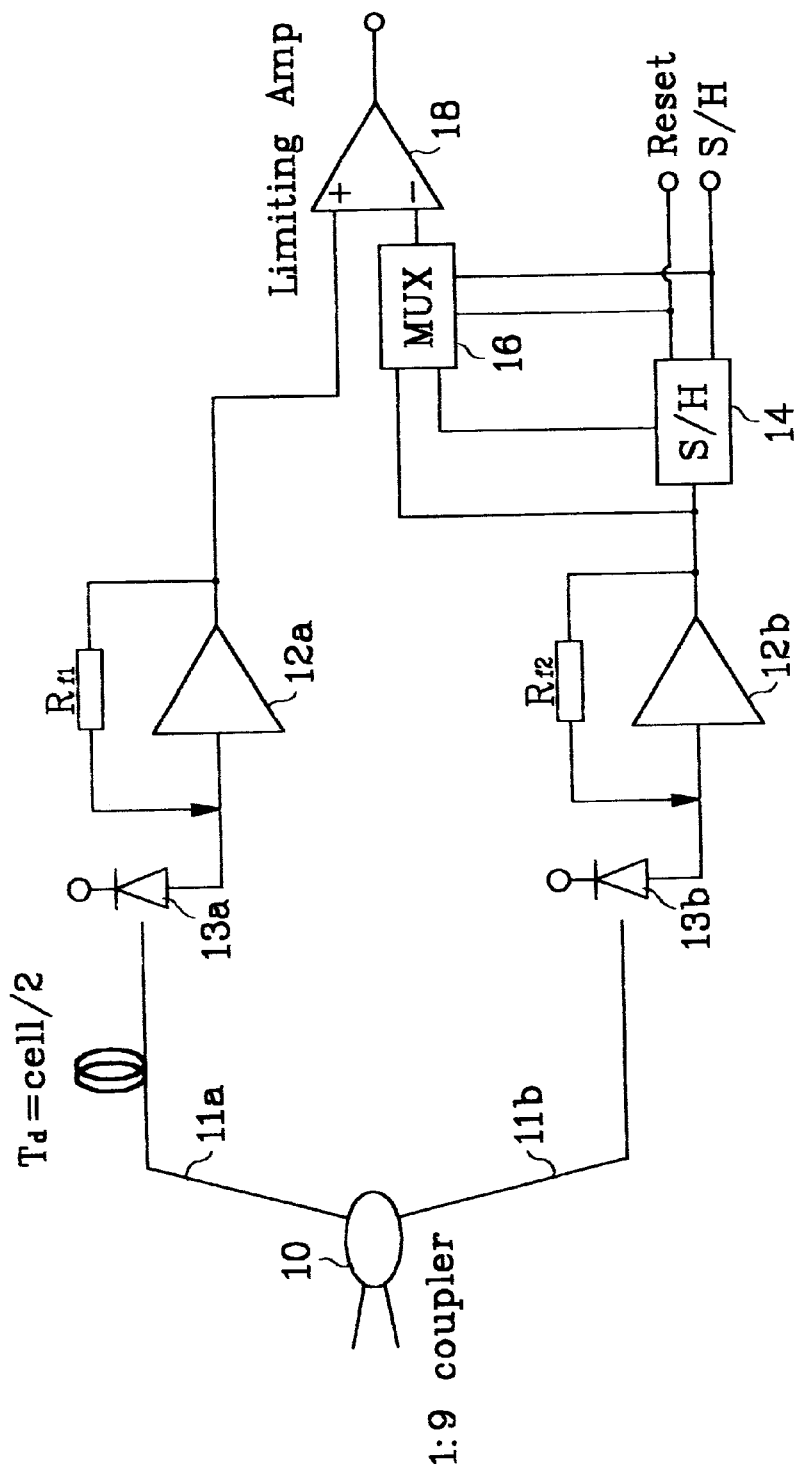
FIG. 1 is a view illustrating a burst mode optical receiver according to the present invention.

FIG. 1 is a view illustrating a burst mode optical receiver according to the present invention.

The optical receiver according to the present invention includes a delay circuit formed of a first optical fiber 11a for delaying an input light signal packet by a half of packet duration and a second optical fiber 11b passing an input light signal packet, first and second photodiodes 13a and 13b generating first and second electrical signals from the received first and second optical signals, respectively, first and second pre-amplifiers 12a and 12b having a wide bandwidth and a narrow bandwidth, respectively a S/H (Sample and Hold) circuit 14, an analog MUX 16 and a limiting amplifier 18.

First, when an optical signal is inputted into the optical coupler 10 having a 1:7 output power ratio, this signal is divided into two parts and then the thusly divided signals are outputted through the first and second optical fibers 1a and 11b. A large power signal outputted through the first optical fiber 11a is delayed as much as the time corresponding to ½ of the packet length and is inputted into the first photodiode 13a. The first photodiode 13a receives the large power signal on the first optical fiber 11a and generates a first electrical signal from the received large power signal. The first electrical signal is inputted into the first pre-amplifier 12a having a bandwidth Bs and is amplified thereby. The thusly amplified signal is inputted into a positive input terminal. The signal is delayed for the reason that it is needed to obtain some time until the output of the second pre-amplifier having a narrow bandwidth reaches the average value.

A small power signal outputted through the second optical fiber 11b is inputted into the second photodiode 13b. The second photodiode 13b receives the small power signal on the second optical fiber 11b and generates a second electrical signal from the received small power signal. The second electrical signal is inputted into the second pre-amplifier 12b having a narrow bandwidth ($B_{TH}$) and then is amplified thereby. The signal is inputted into a negative input terminal of the limiting amplifier 18. At this time, since the bandwidth $B_{TH}$ of the second pre-amplifier 12b is very narrow, the output from the amplifier 12b becomes a result of the integration of the signal for thereby obtaining the mean value of the signal from which the noise is removed. This mean value is set as a threshold voltage of the decision circuit. The receiving penalty may be expressed as follows based on the bandwidth ratio of the pre-amplifiers 12a and 12b compared to the conventional optical receiver.

$$Penalty_{threshold} = 5 \log\left(1 + \frac{B_{TH}}{B_S}\right) \quad \text{[Equation 1]}$$

In addition, since the input optical signal is divided using the optical coupler 10, a penalty is additionally generated. The power dividing ratio of the optical coupler 10 should be a reverse number of the bandwidth ratio for making the output levels of the two pre-amplifiers same, so that the penalty may be expressed as follows.

$$Penalty_{coupler} = 10 \log(1+1/n) \quad \text{[Equation 2]}$$

Therefore, the total penalty of the optical receiver may be expressed as follows.

$$Penalty_{total} = 15 \log\left(1 + \frac{B_{TH}}{B_S}\right) \quad \text{[Equation 3]}$$

Figure 2A:
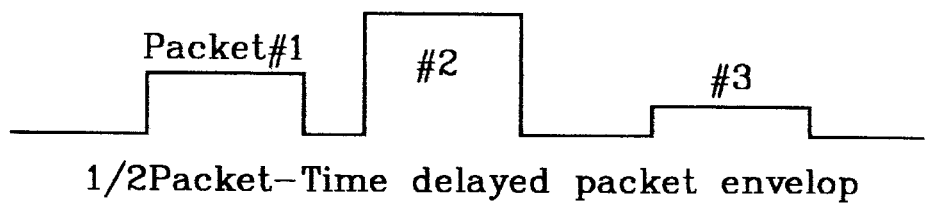
FIGS. 2A through 2D are waveform diagrams illustrating a burst mode optical receiver operation according to the present invention.
Figure 2B:
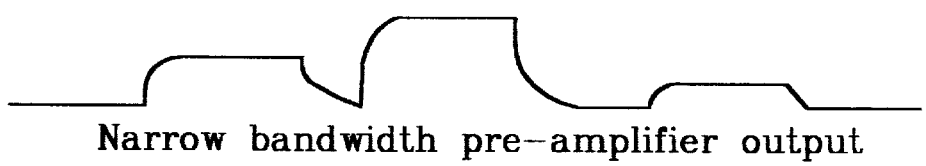
Figure 2C:
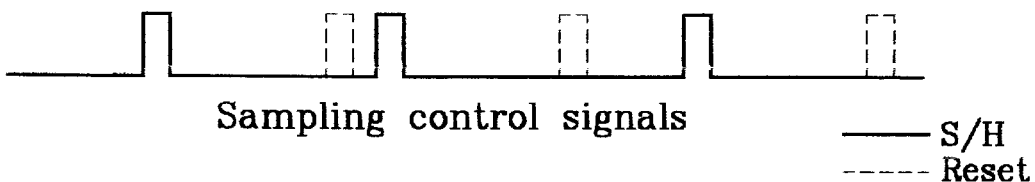
Figure 2D:
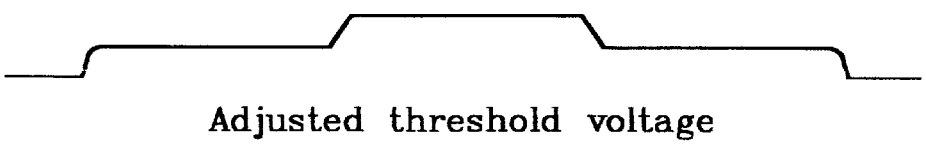

FIGS. 2A through 2D are waveform diagrams illustrating a burst mode optical receiver operation according to the present invention. FIG. 2A illustrates an envelope of a packet signal received from the first pre-amplifier 12a having a large bandwidth. The waveform of FIG. 2A is delayed by ½ of the packet length compared to the output waveform of FIG. 2B of the second pre-amplifier 12b having a narrow bandwidth. FIG. 2C illustrates a S/H (Sample and Hold) signal and a reset signal. When the first data bit of the packet is received, the S/H control signal is outputted as pulse, and the reset is outputted as a pulse after the final data bit of the packet is received. The MUX 16 selects the output from the second pre-amplifier 12b having a narrow bandwidth and selects a sampled threshold voltage when the S/H control signal is inputted. The reset signal changes the output of the S/H circuit 14 to "0" and switches the selection of the MUX 16 to the second pre-amplifier 12b. FIG. 2D illustrates a threshold voltage control signal of the limiting amplifier 18.

Figure 3:
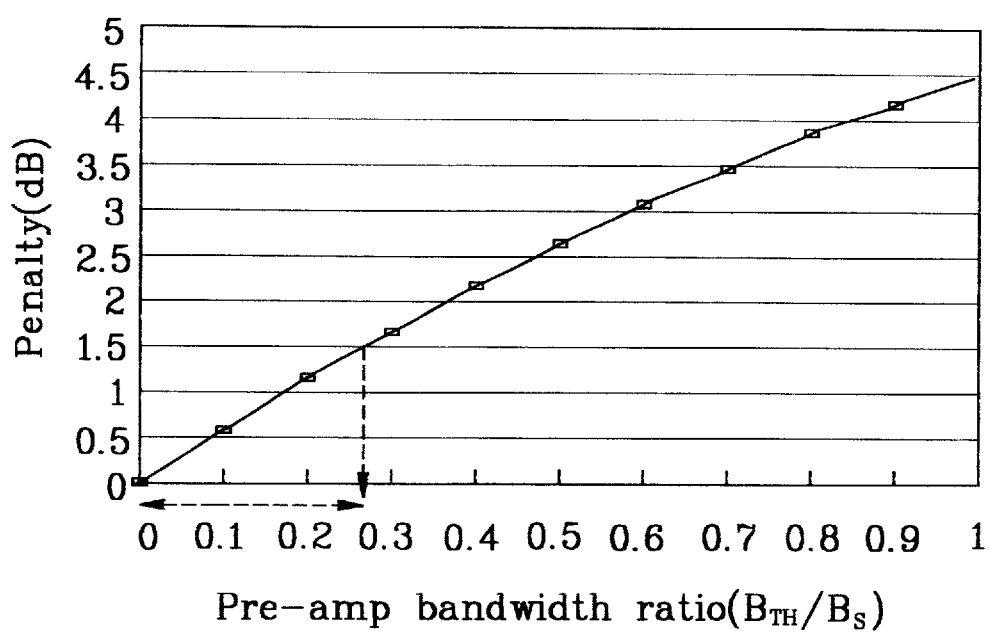
FIG. 3 is a graph illustrating a penalty based on the ratio of bandwidth of two pre-amplifiers according to the present invention.

FIG. 3 is a graph illustrating a penalty based on the ratio of bandwidth of two pre-amplifiers according to the present invention. As shown therein, when the bandwidth of two pre-amplifiers are the same, since the penalty 3 dB of the optical coupler 10 and the penalty of the burst mode optical receiver are summed, a 4.5 dB penalty is generated. However, when decreasing the bandwidth of one pre-amplifier, the penalty is decreased. When the bandwidth ratios of two amplifiers are determined by the range indicated by the bidirectional arrow of FIG. 3, it is possible to implement an optical receiver having a penalty below 1.5 dB. If the bandwidth ratio is below 0.1, it is possible to decrease the penalty below 0.5 dB.

In the conventional burst mode receiving method, the 1.5 dB power penalty occurs during the process for compensating different mean powers for every packet. In order to decrease the penalty, since the preamble bits should be inserted into the earlier portion of the packet, the transmission efficiency is decreased.

The optical receiver according to the present invention is formed of two pre-amplifiers having different bandwidth, an optical coupler and an optical delay unit. Therefore, it is possible to decrease the 1.5 dB penalty without using a preamble bit by receiving a signal separated from the optical coupler based on the pre-amplifier of a narrow bandwidth for thereby obtaining a noise-removed signal and using this signal for setting a threshold voltage of the limiting amplifier of the next terminal. In order to decrease the penalty below 0.5 dB, the bandwidth ratio of two pre-amplifiers is controlled to be below 0.1.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A burst mode optical receiver, comprising:

an optical coupler for splitting an input optical signal into two parts and outputting the split optical signals;

a delay circuit formed of a first optical fiber delaying an optical signal packet outputted from the optical coupler by a half of packet duration and a second optical fiber passing the optical signal packet without delaying the optical signal packet;

a first pre-amplifier having a wide bandwidth for receiving a first electrical signal converted from an optical signal from the first optical fiber and amplifying the first electrical signal; and a second pre-amplifier having a narrow bandwidth for receiving a second electrical signal converted from an optical signal from the second optical fiber and amplifying the second electrical signal.

2. The receiver of claim 1, further comprising a limiting amplifier having a positive input terminal connected with an output terminal of the first pre-amplifier and a negative input terminal connected with an output terminal of the second pre-amplifier.

3. The receiver of claim 1, further comprising:

an analog MUX (multiplexer) for controlling an output of a limiting amplifier between the second pre-amplifier and the limiting amplifier; and an S/H (Sample and Hold) circuit for outputting an S/H signal to the analog MUX upon receiving an S/H control signal, and for outputting a "0" signal upon receiving a reset control signal.

* * * * *